United States Patent [19]

Toyooka et al.

[11] Patent Number: 4,648,027
[45] Date of Patent: Mar. 3, 1987

[54] PROGRAMMABLE CONTROLLER HAVING SELECTIVELY PROHIBITED OUTPUTS

[75] Inventors: Katsuji Toyooka; Hisashi Shigematsu, both of Tokyo, Japan

[73] Assignee: Koyo Electronics Industries, Co., Ltd., Tokyo, Japan

[21] Appl. No.: 842,378

[22] Filed: Mar. 20, 1986

Related U.S. Application Data

[63] Continuation of Ser. No. 523,976, Aug. 17, 1983, abandoned.

[30] Foreign Application Priority Data

Aug. 20, 1982 [JP] Japan ................... 57-145120

[51] Int. Cl.⁴ .................. G05B 9/02; G06F 11/00
[52] U.S. Cl. .................. 364/184; 364/140; 364/141; 364/186; 364/900; 371/20
[58] Field of Search ........... 364/140, 141, 184, 186, 364/200, 900; 371/12, 14, 16, 20

[56] References Cited

U.S. PATENT DOCUMENTS

| | | | |
|---|---|---|---|
| 3,551,885 | 12/1970 | Henzel | 364/184 |
| 3,928,830 | 12/1975 | Bellamy et al. | 364/900 |
| 3,997,879 | 12/1976 | Markley et al. | 364/184 |
| 4,071,911 | 1/1978 | Mazur | 364/900 |
| 4,118,792 | 10/1978 | Struger et al. | 364/184 |
| 4,155,115 | 5/1979 | Wilske | 364/140 |
| 4,228,496 | 10/1980 | Katzman et al. | 364/200 |
| 4,377,000 | 3/1983 | Staab | 364/184 |
| 4,456,966 | 6/1984 | Bringol et al. | 364/900 |
| 4,488,303 | 12/1984 | Abramovich | 371/12 |
| 4,514,804 | 4/1985 | Kimoto | 364/200 |
| 4,527,271 | 7/1985 | Haller et al. | 364/184 |

FOREIGN PATENT DOCUMENTS 127206 10/1981 Japan .
20807 2/1982 Japan .

OTHER PUBLICATIONS

"Program Monitoring Technique", Flanagan, G. H., IBM Tech. Bulletin, vol. 13, No. 8, pp. 2399-2401, Jan. 1971.
"Maintenance Scanner," Stringfellow et al., IBM Tech. Bulletin, vol. 3, No. 12, May 1961.

*Primary Examiner*—Jerry Smith
*Assistant Examiner*—John R. Lastova
*Attorney, Agent, or Firm*—Burns, Doane, Swecker & Mathis

[57] ABSTRACT

A programmable controller which operates in accordance with instructions of a stored program is capable of prohibiting outputs to selected controlled external apparatuses at any step in a control sequence. Following removal of the output prohibition, the control sequence is subsequently executed from the state present when the output was prohibited. The controller safely stops the sequential operation of controlled external apparatuses, and restarts the operation of the external apparatuses without wasting time.

2 Claims, 4 Drawing Figures

PROGRAMMABLE CONTROLLER HAVING SELECTIVELY PROHIBITED OUTPUTS

This application is a continuation of application Ser. No. 523,976, filed Aug. 17, 1983, now abandoned.

BACKGROUND OF THE INVENTION

1. Field of the Invention

This invention relates to a programmable controller of a stored program type, and more particularly to a programmable controller capable of prohibiting an external output at an optional step or release it to continue the sequential operation from the state before the prohibition.

2. Description of the Prior Art

FIG. 1 is a schematic block diagram of the programmable controller of stored program type, in which a CPU (central processing unit) 1 serving as the control nucleus operates according to the contents stored in a system memory 2, reads a program related to the sequential operation in succession from a program memory 3 storing therein the program, and decides it. In a case where an instruction defined by the program refers to the state of input-output signal, CPU has accesses to an input/output memory 4 to read the necessary information to execute necessary computations in accordance with the instruction, the input/output memory 4 being connected to an input interface 6 and an output interface 7 through an input/output controller 5 to thereby store the state of a switch 8, sensors, etc., connected to the input interface 6. The input interface 6 converts the signal level obtained from the switch 8 and the like into the level necessary for read-in through the input/output controller 5. When the instruction is to store the result of computation, the result, such as output information or the like is written into the input/output memory 4. After such process, CPU gives a command to the input/output controller 5 and reads successively the output information stored in the input/output memory 4 in order to provide the corresponding output interface 7 with a control signal for actuating the external apparatus, such as switch 9, connected to the output interface 7. The output interface 7 holds the control signal until new signals are given thereto and carries out the level conversion necessary to actuate the external apparatus, such as relay 9.

The input interface 6 and output interface 7, which are so constructed that many external apparatuses can be connected thereto respectively, complete one cycle of operation upon finishing the aforesaid input-output operation about all terminals, thus repeating the execution of the cycle operation.

Now, in a case where apparatuses controlled by such programmable controller are subjected to adjustment, inspection and repair, it has been impossible for the conventional programmable controller to temporarily stop the actuating of the apparatuses for adjustment or the like on the way of operation and thereafter continue the predetermined sequential operation from the state before the stop. Presumably, for the temporary stop of sequential operation of apparatuses, the operation of the programmable controller itself needs to be stopped and, when stopped, returned to the initial state, whereby the apparatuses, when they restart, should execute the sequential operation from the first step, which is largely wasteful of time. Especially in a continuous process control including heat treatment, much time elapses before the apparatus returns to the state before the stop, thereby causing a problem in that materials under the heat treatment may be useless.

In order to solve the above problem, the following constructions are well known:

1. A relay is interposed between the output interface of programmable controller and the apparatuses so that the contact of relay is disconnected to cut off the control signal output from the programmable controller.

2. A self-holding circuit is provided at respective circuit for connecting external apparatus of the output interface of programmable controller to thereby disable send-out of output signal (the self-holding circuit, even when the output signal disappears, acts to keep the previous condition).

3. The external output prohibition terminal is provided at the input interface of the programmable controller, which, when given a temporary stop command signal, prohibits the output in one lot.

The above constructions of items (1) and (2), however, require the provision of a relay or a self-holding circuit outside or inside the programmable controller so that the whole construction is complicated, thereby having the defect that a load on the capacity of program memory unit increases and it is difficult to grasp the operation of circuit. In item (3), there is a defect that the collective prohibit of output is not suitable for the continuous process control necessary to hold the operation of apparatuses in part.

In the light of the above problem, this invention has been designed. An object thereof is to provide a programmable controller which temporarily stops operation of apparatuses to be controlled and thereafter enable the predetermined sequential operation to be continued from the state before the stop of operation.

Another object of the invention is to provide a programmable controller which, when applied to the continuous process control including heat treatment, is capable of restarting the process without wasting time at the aforesaid temporary cessation and avoiding a waste of an object under heat treatment.

Still another object of the invention is to provide a programmable controller which is adapted to enable an output only of necessary part to be prohibited, in other words, that of unnecessary part not to be prohibited, to thereby avoid inconvenience according to nonoperation of apparatuses to be controlled, and which keep safety.

The above and further objects and novel features of the invention will more fully be apparent from the following detailed description with the accompanying drawings.

DETAILED DESCRIPTION OF THE INVENTION

Figure 1:
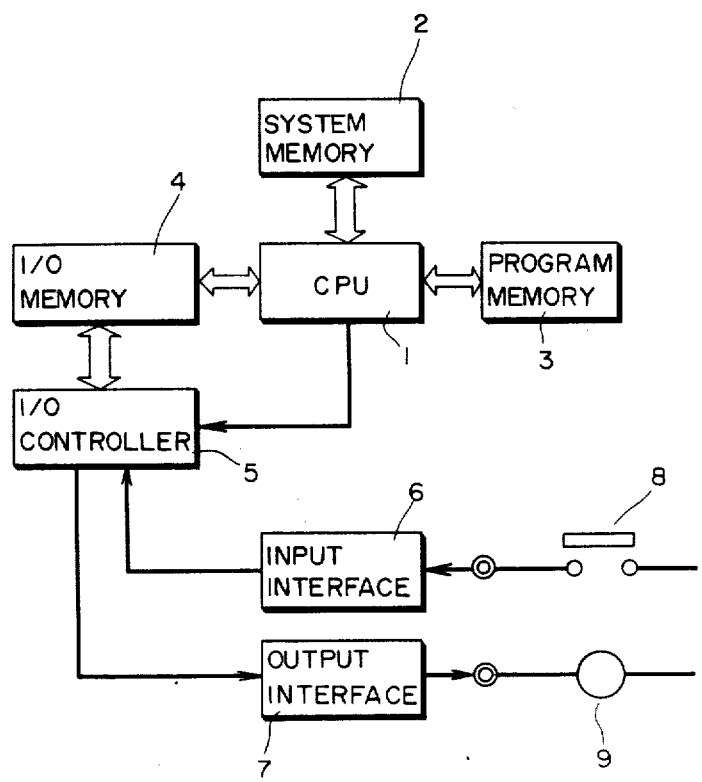
FIG. 1 is a block diagram of a programmable controller.

The hardware constitution of a programmable controller of the invention is basically similar to that shown in FIG. 1, which may at need include a switch (corresponding to that of 000 or 001 in FIG. 3) for temporarily halting input. Other operating members may also serve as the switch, or the switch may be implemented by software.

Figure 2:
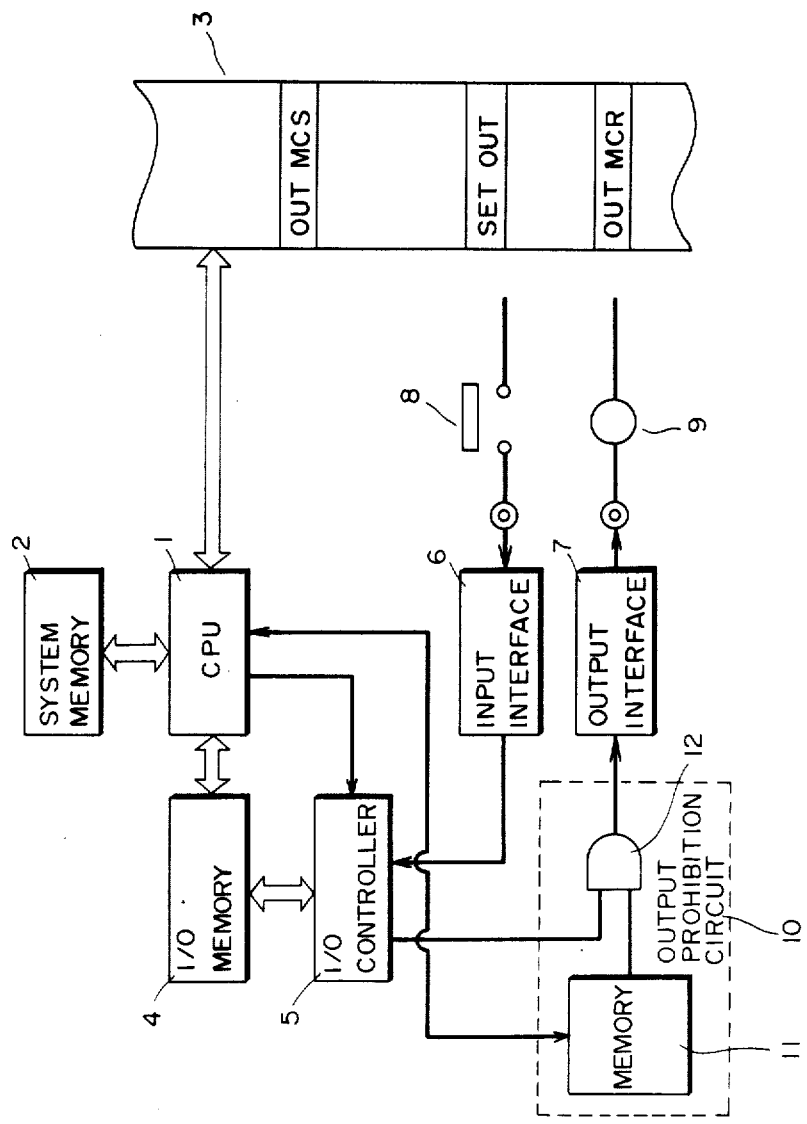
FIG. 2 is a view explanatory of the concept of the programmable controller of the invention.

The output prohibiting operation of the programmable controller of the invention is executed by control of CPU, i.e., software, for an input/output controller 5. Conceptually, it can be said that an output inhibit circuit 10, as shown in FIG. 2, is provided to prohibit the input-/output controller 5 from giving a control signal to an output interface 7 (such hardware constitution may of course be adopted to the programmable controller of the invention). Firstly, explanation will be given on the invention in accordance with FIG. 2, in which the output prohibiting circuit 10 comprises; a memory 11 which stores the output prohibition instruction, output prohibition releasing instruction, and forced change instruction for forcibly changing (releasing) the state obtained by the output prohibition instruction, generated according to the program contents read by CPU from a memory unit 3; and a logic gate 12 which is given a memory content output signal and control signal to be relayed from the input/output controller 5 to the output interface 7. In a case where the memory 11 is given the output prohibiting signal and stores it, the output signal of memory 11 closes the logic gate 12 to prohibit control signal transferred from the input/output controller 5 to output interface 7. Conversely, in a case where the memory 11 stores the output prohibition releasing instruction, the logic gate 12 is open to allow transfer of the above control signal. The memories 11 and logic gates 12 are deemed to be provided as many terminals (or external apparatuses to be connected thereto) as the input interface 7. In a case of giving the output prohibiting instruction, the forced change instruction can be given to the bit parts corresponding to the specified terminals, which are released from the output prohibition to output the control signal.

Hence, when a program of the contents which can give to the memory 11 the output prohibition instruction and output prohibition releasing instruction at every sequence block required at the program relating to the sequential operation to be stored in the program memory 3 has been inserted therein, the output prohibition instruction can be given to keep the output prohibiting condition by use of a method, for example, of the predetermined input control during the operational control relating to the sequence block, or the output prohibiting condition can be released by the method of the predetermined input control. This operation, when viewed from actual operation of CPU due to software, can realize the output prohibition by nonexecution of instructions relating to the external output among the assigned sequence blocks during the repeat execution of program stored in the program memory 3. On the other hand, in a case of releasing the prohibition, since the subsequent repeating cycle period executes the external output instruction at said sequence block, the external apparatuses lead to its operation in succession of the state before the prohibition. In a case where under the above state of external output prohibition the output prohibition is not desired for the specified external apparatus, a program related to the forced change instruction need only be inserted in order to permit the output with respect to the terminal at the output interface 7 regarding the external apparatus.

Next, concrete explanation will be given on the invention according to FIG. 3, in which a circuit to be controlled by the programmable controller of the invention is shown by a relay ladder chart and the program to be stored in the program memory 3 for executing such control is shown together.

Figure 3:
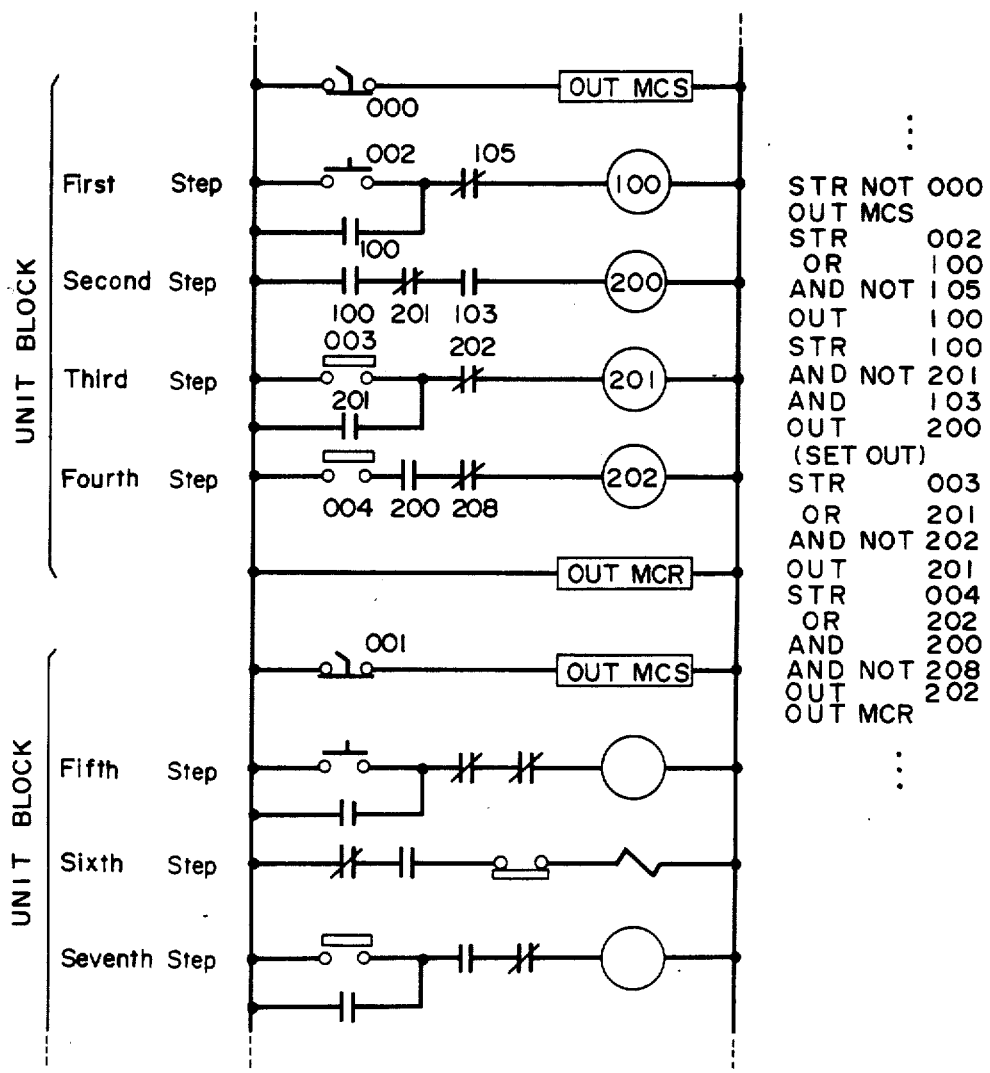
FIG. 3 shows a relay ladder chart of an example of program.

In the relay chart, a normally open manual switch 002 is connected in parallel to a normally open contact of a relay 100 within the programmable controller and in series with a normally closed contact 105 and a coil of the internal relay 100 so that operation of such series circuit, that is, the self-holding of internal relay 100 by closing the switch 002, is defined as the first step portion shown in FIG. 3.

The operation of a series circuit of a normally open contact of internal relay 100, a normally closed contact of an external relay 201 (a relay connected to the terminal 102 specified at the output interface 7), a normally open contact of an internal relay 103, and an external load 200 (e.g., a single solenoid), is defined as the second step.

The operation of a series circuit comprising a parallel circuit of a normally open contact at a limit switch 003 and a normally open contact of external relay 201, and a series circuit of a normally closed contact of an external relay 202 and a coil of external relay 201, is defined as the third step, wherein the external relay 201 is self-held by series connection of its coil and normally open contact.

The operation of a series circuit of a normally open contact of a limit switch 004, a circuit element which is nonoperable when the external load is actuated, a normally closed contact of a relay 208, and a coil of external relay 202, is defined as the fourth step. The first through fourth steps serve as unit sequence blocks to execute the external output prohibition. [OUT MCS] (Output Master Control Set) and [OUT MCR] (Output Master Control Reset) shown make use of instruction words in the program to imaginarily represent front-to-back of the respective sequence blocks, so that the block, when the normally closed switch 000 connected to [OUT MCS] is closed, operates normally. During normal operation, if the normally open switch 002 is closed, the internal relay 100 is energized since the contact 105 is normally closed. The energization of the internal relay 100 latches the normally open contact 100 in the closed position. Thus, the relay 100 is self-latching. When the relay 100 is energized, the load 200 is energized if the contact 201 and the contact 103 are closed. When the limit switch 003 is closed, the external relay 201 is energized and self-latched if the normally closed contact 202 is closed. Energization of the relay 201 deenergizes the load 200. When the limit switch 004 is closed, the external relay 202 is energized if the external load 200 is energized and the normally closed contact 208 is closed. Energization of the relay 202 causes the relay 201 to be deenergized. On the contrart, when the switch 000 is opened, the block is kept in output prohibition. In brief, when the instruction word OUT MCS has been prepared and switch 000 is open, the output prohibition instruction is stored in the memory 11 and when the switch 000 is restored to be on, the output prohibition releasing instruction is stored in the same.

Accordingly, the switch 000 is opened to prohibit send-out of output signal to the external apparatuses 200, 201 and 202, and their actuating are stopped, but in a case where the self-holding depends on the condition of external output as the third step, the self-holding is not released. Hence, when the switch 000 is on and releases the output prohibition, the control operation restarts directly from the above condition. Subsequent blocks to those in the first through fourth steps are defined as the fifth step and so on, and operate in continuation of OUT MCS related to the switch 001 for giving the command of output prohibition.

Next, explanation will be given on the program entered together in FIG. 3. STR represents a store to be used for indication of the initial condition for each step, NOT representing nonoperation, normally closed contact, etc. Numerals at the right hand represent numbers for specifying terminals (or external apparatuses to be connected thereto) of input interface 6 and output interface 7, those specifying timers and counters in the programmable controller, or stage numbers (to specify the step of operational unit at the programmable controller of stage type (JAPANESE PATENT KOKAI (LAID-OPEN) No. 52-120347 (1977))).

The next reference OUT MCS designates an instruction to a master control set which commands that this instruction governs operation in connection with the output in the following step, the instruction being unnumbered and having the contents that two instructions of STR NOT 000 and OUT MCS turns off the switch 000 connected to the input interface 6 (or the NOT condition on the software at the stage 000 holds), thereby executing the output prohibition until OUT MCR is given to define a final unit block.

In the subsequent first through fourth steps, AND designates an instruction of a series circuit or a logical product of condition, OR designates an instruction of a parallel circuit ior a logical add of condition, and OUT designates an output instruction, the instruction OUT being not executed by the above conditions.

Figure 4:
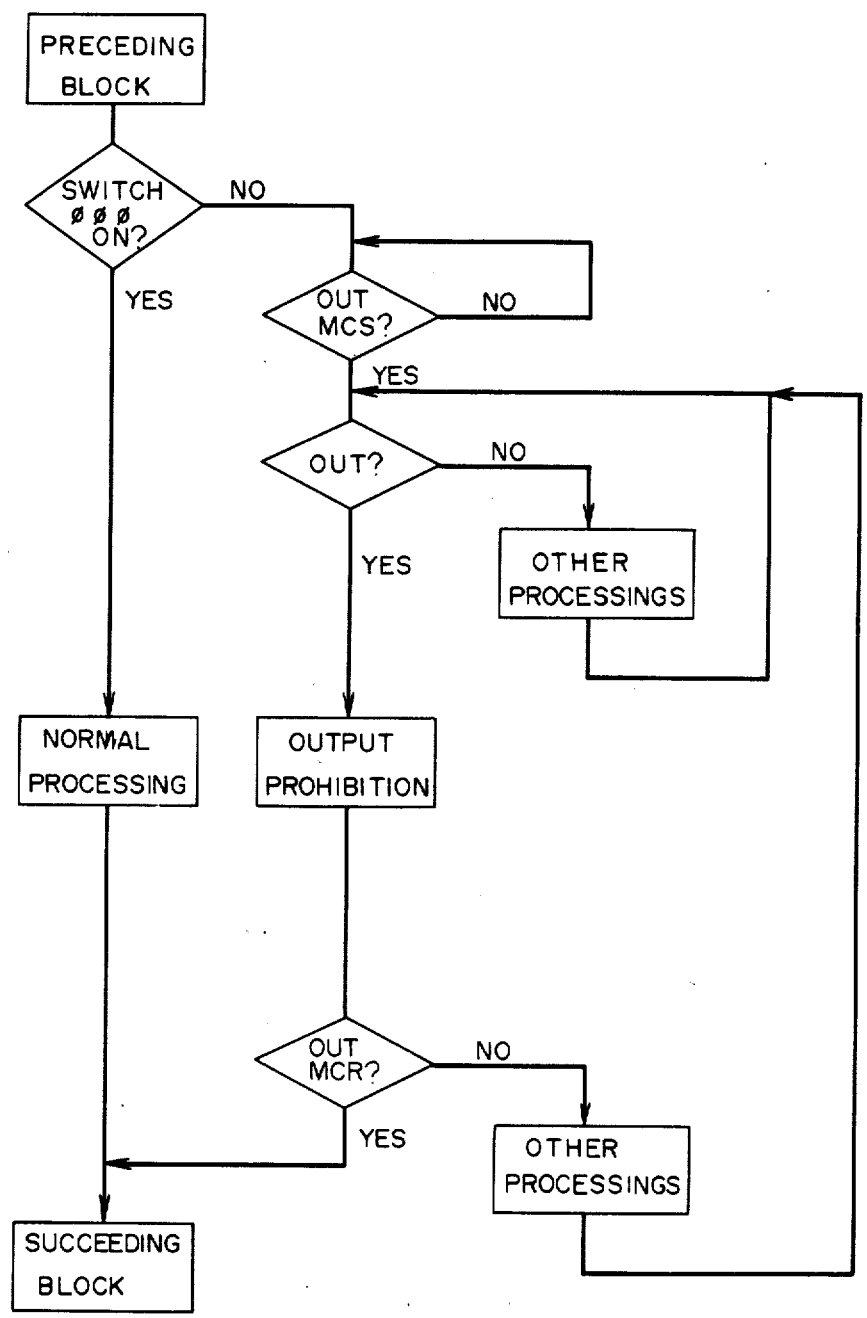
FIG. 4 is a flowchart of the outline of the control contents of CPU.

FIG. 4 is a flowchart of schematic control contents of CPU1 as to the output prohibition or execution prohibition by instruction OUT. A switch for output prohibition command, that is, switch 000 in this embodiment, as to a certain block is checked to determine whether it is on or off so that, when on, the normal processing is executed in order without giving the output prohibition and then the program transfers to a succeeding block. On the contrary, when the switch 000 is off, the instruction other than an output instruction OUT are executed, and at the step of the output instruction OUT a signal for output prohibition is given to the input/output controller 5 or the output interface 7. Then the process, when it enters into the step of defining by the instruction OUT MCR the end of the preceding block, transfers to the succeeding block. Even if output prohibition is executed by the turn-off of switch 000 as described above, upon turning-on the switch 000, the normal processing is executed at the succeeding cycle of this block, that is, external output instruction OUT is executed to actuate the apparatus to be controlled in succession of the state before the prohibition.

In a case where the external load 200 is the single solenoid as abovementioned, even when the external output is prohibited to temporarily stop the external apparatuses, the single solenoid may be intended to keep its excitation. SET OUT instruction put in parentheses as to external apparatus 200 is for forcibly changing the output prohibition as to the external apparatus only in spite of the output signal prohibition within the block, whereby the corresponding bit at the memory 11 stores the forced change instruction to permit its output. In addition, under the condition of releasing the output prohibition, instruction SET OUT executes the same process as that OUT.

As seen from the above, the programmable controller of the invention, when its operations is once cut off for adjustment of external apparatuses or the like, is adapted to prohibit the output only for the necessary part without shutting down the circuit of CPU and input/output controller 5. The operation of apparatuses to be controlled of course is safety stopped and also when the output prohibition is released, the predetermined sequential operation is executed in succession of the state before the stoppage, whereby there is no waste of time and waste of the materials being treated by the controlled apparatuses.

Even if such condition of output prohibition, it is possible to put the specified external apparatuses in operation by the forced change instruction, so that the programmable controller of the invention is advantageous in that the application of the invention is not limited by the type of apparatus to be controlled.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds are therefore intended to be embraced by the claims.

What is claimed is:

1. A programmable controller including a processing unit having a processor, a program memory and an input/output controller, wherein said processor operates in accordance with instructions contained in a program stored in said memory to execute a sequential control operation on controlled apparatuses external to said programmable controller, said program including a plurality of predetermined instruction blocks, said input/output controller for controlling transfer of signals between said processing unit and said controlled external apparatuses, comprising:
   an output interface connected with said input/output controller for outputting a control signal which controls operation of said controlled external apparatuses;
   means for providing each of said instruction blocks in said program with an instruction to prohibit an output to at least one controlled external apparatus associated with the individual block;
   means responsive to said prohibit instruction to selectively inhibit said output interface from outputting a control signal to at least one controlled external apparatus; and
   means for selectively overriding said control signal output inhibition to at least one of said controlled external apparatuses.

2. A programmable controller including a processing unit having a processor, a program memory and an input/output controller, wherein said processor operates in accordance with instructions contained in a program stored in said memory to execute a sequential control operation on controlled apparatuses which are external to said programmable controller, said program including a plurality of predetermined instruction blocks, said input/output controller for controlling transfer of signals between said processing unit and said external apparatuses, comprising:

an output interface connected with said input/output controller and operable in response to said stored program for outputting control signals which control operation of said controlled external apparatuses;

means for providing each of said instruction blocks in said program with an instruction to prohibit an output to at least one controlled external apparatus associated with the individual block;

means responsive to said prohibit instruction to selectively inhibit said output interface from outputting a control signal to at least one controlled external apparatus, said programmable controller continuing sequential execution of said stored program; and means for selectively overriding said control signal output inhibition to at least one of said controlled external apparatuses.

* * * * *